United States Patent
Ohyama et al.

(10) Patent No.: US 7,773,136 B2
(45) Date of Patent: Aug. 10, 2010

(54) IMAGE PICKUP APPARATUS AND IMAGE PICKUP METHOD FOR EQUALIZING INFRARED COMPONENTS IN EACH COLOR COMPONENT SIGNAL

(75) Inventors: Tatsushi Ohyama, Ogaki (JP); Keisuke Watanabe, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 378 days.

(21) Appl. No.: 11/889,771

(22) Filed: Aug. 16, 2007

(65) Prior Publication Data

US 2008/0049115 A1 Feb. 28, 2008

(30) Foreign Application Priority Data

Aug. 28, 2006 (JP) .............................. 2006-231384
Oct. 12, 2006 (JP) .............................. 2006-279293

(51) Int. Cl.
*H04N 5/235* (2006.01)
*H04N 9/083* (2006.01)

(52) U.S. Cl. ..................... 348/276; 348/229.1; 348/279

(58) Field of Classification Search ................. 348/164, 348/229.1, 230.1, 273, 276, 277, 279
See application file for complete search history.

(56) References Cited

U.S. PATENT DOCUMENTS

| | | | | |
|---|---|---|---|---|
| 6,211,521 | B1 * | 4/2001 | Bawolek et al. | 250/339.02 |
| 6,657,663 | B2 * | 12/2003 | Morris | 348/273 |
| 6,759,646 | B1 * | 7/2004 | Acharya et al. | 250/226 |
| 7,170,046 | B2 * | 1/2007 | Higashitsutsumi | 250/226 |
| 7,460,160 | B2 * | 12/2008 | Hershey et al. | 348/273 |
| 2006/0188155 | A1 * | 8/2006 | Matsuyama | 382/167 |
| 2007/0070224 | A1 * | 3/2007 | Sasaki | 348/273 |
| 2007/0146512 | A1 * | 6/2007 | Suzuki et al. | 348/272 |
| 2007/0187794 | A1 * | 8/2007 | Fukuyoshi et al. | 257/440 |
| 2007/0201738 | A1 * | 8/2007 | Toda et al. | 382/144 |
| 2008/0068475 | A1 * | 3/2008 | Choe et al. | 348/273 |
| 2008/0088826 | A1 * | 4/2008 | Ohyama et al. | 356/51 |

FOREIGN PATENT DOCUMENTS

| | | |
|---|---|---|
| JP | 06-105319 | 4/1994 |
| JP | 11341502 A | * 12/1999 |
| JP | 2002-142228 | 5/2002 |

OTHER PUBLICATIONS

Japanese Notification of Reason(s) for Refusal, w/ English translation thereof, issued in Japanese Patent Application No. 2006-279293 dated on Aug. 19, 2008.

* cited by examiner

*Primary Examiner*—John M Villecco
(74) *Attorney, Agent, or Firm*—McDermott Will & Emery LLP

(57) ABSTRACT

An image pickup device receives an incident light by way of the color filter that also transmits an infrared light component. For the purpose of correcting an infrared light component contained in an output signal, a control unit adds correcting infrared light components to image signals of multiple colors supplied from the image pickup device, respectively. To remove the infrared light components contained in the output signals, the correcting infrared light components are subtracted from the image signals of multiple colors supplied from the image pickup device. The control unit switches between an addition processing where an infrared light component is added and a subtraction processing where the infrared component is subtracted, according to a predetermined condition.

18 Claims, 9 Drawing Sheets

FIG.4

| LUMINANCE | PROCESSING |
|---|---|
| BRIGHT | SUBTRAC-TION |
| DARK | ADDING |

| RELATION | VISIBLE > INFRARED | VISIBLE < INFRARED |
|---|---|---|
| PROCESSING | SUBTRACTION | ADDING |

50b

50c

IMAGE PICKUP APPARATUS AND IMAGE PICKUP METHOD FOR EQUALIZING INFRARED COMPONENTS IN EACH COLOR COMPONENT SIGNAL

CROSS-REFERENCE TO RELATED APPLICATIONS

This application is based upon and claims the benefit of priority from both the prior Japanese Patent Application No. 2006-279293, filed Oct. 12, 2006 and the prior Japanese Patent Application No. 2006-231384, filed Aug. 28, 2006, the entire contents of which are incorporated herein by references.

BACKGROUND OF THE INVENTION

1. Field of the Invention

The present invention relates to an image pickup apparatus for taking color images and an image pickup method.

2. Description of the Related Art

Digital still cameras and digital movie cameras capable of taking color images are now in wide use. Image pickup devices mounted on such image pickup apparatuses have photographic sensitivity to infrared light, too. Thus, when infrared light is contained in incoming light, not only visible light component but also error components due to the infrared light are contained in an output signal thereof and therefore the color reproducibility deteriorates.

On the other hand, a method is available where an infrared light cut filter is used for an optical system in order to remove the infrared light contained in the incident light. Nevertheless, the infrared light cut filter is rather costly and it also has to be placed within the optical system, thus imposing a constraint on a design of the optical system. Also, it is difficult for the infrared light cut filter to purely remove the infrared light alone and there are cases where the input of the visible light is also attenuated. In such a case, the sensitivity of the image pickup devices deteriorates and therefore the color reproducibility drops.

SUMMARY OF THE INVENTION

An image pickup apparatus according to one embodiment of the present invention comprises: a color filter of multiple colors which transmits an infrared light component; an image pickup device which receives an incident light by way of the color filter; and a control unit which switches, according to a predetermined condition, between an addition processing where a correcting infrared light component for correcting an infrared component contained in an output signal is added to the output signal of each color component in the image pickup device and a subtraction processing where the infrared component contained in the output signal is removed from the output signal of each color component.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4 shows a condition table according to a first exemplary embodiment;

FIG. 5 shows a condition table according to a second exemplary embodiment;

DETAILED DESCRIPTION OF THE INVENTION

Figure 1:
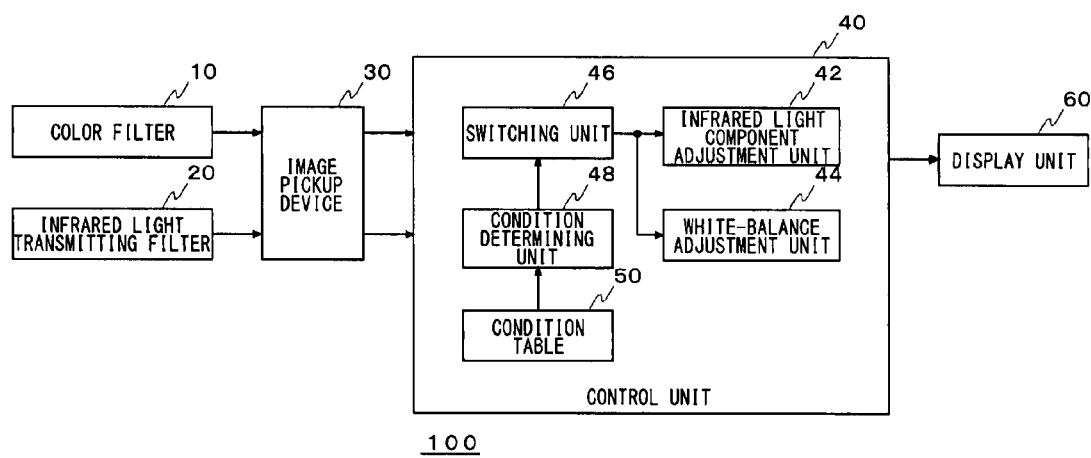
FIG. 1 is a diagram showing a structure of an image pickup apparatus according to an embodiment of the present invention.

The invention will now be described by reference to the preferred embodiments. This does not intend to limit the scope of the present invention, but to exemplify the invention.

Firstly, a description is given of representative modes of carrying out the present invention before explaining preferred embodiments thereof. An image pickup apparatus according to one embodiment of the present invention comprises: a color filter of multiple colors which transmits an infrared light component; an image pickup device which receives an incident light by way of the color filter; and a control unit which switches, according to a predetermined condition, between an addition processing where a correcting infrared light component for correcting an infrared component contained in an output signal is added to the output signal of each color component in the image pickup device and a subtraction processing where the infrared component contained in the output signal is removed from the output signal of each color component. In the addition processing (hereinafter referred to as "adding processing" also), an infrared light component for correction may be added in such a manner that infrared light components contained in the output signals are equal to each other. "Infrared light components are equal" includes also a case where the infrared light components are practically equal. If the difference in integration values of spectral sensitivity in the range of wavelength, which can be regarded as the infrared light component, contained in the output signal of each color component is $1/100$ or less of each integration value, the infrared light components may be regarded as being equal. For example, when the difference in integration values for the component whose wavelength in the spectral sensitivity characteristics is 700 nm or more in the output signal of each color component is $1/100$ or less, the infrared light components may be regarded as being equal.

According to this embodiment, in order to correct an infrared component contained in the output signal of each color component, an infrared light component for correction is added or subtracted according to a predetermined condition. Thereby, the color reproducibility can be enhanced by adjusting the sensitivity.

The control unit may detect the brightness of a captured pixel from the output signal of each color component and switch between the addition processing and the subtraction processing according to the brightness thereof. When the "brightness of a pixel" exceeds a predetermined threshold, the subtraction processing may be selected; and when it does not exceed the predetermined threshold, the addition processing may be selected. According to this structure and operation, the increase in noise components due to the correction can be suppressed while the degradation in sensitivity is being suppressed.

The control unit may switch between the addition processing and the subtraction processing according to a relation between a visible light component contained in the output signal of each color component and the infrared light component received by the image pickup device. When the "visible light component" is larger than the "infrared light component", the subtraction processing may be selected; and when smaller, the addition processing may be selected. The "infrared light component" may be received through an infrared light transmitting filter. According to this structure and operation, the increase in noise components due to the correction can be suppressed while the degradation in sensitivity is being suppressed.

When a luminance value obtained from the output value of each color component exceeds a predetermined threshold value and is greater than the infrared component contained in the output signal received by image pickup device, the control unit may select the subtraction processing. According to this structure and operation, the increase in noise components due to the correction can be suppressed and further accuracy is ensured while the degradation in sensitivity is being suppressed.

A white balance may be achieved by increasing or decreasing the output signal of each color component, and a first infrared light component for correction may be added to the output signal of each color component in such a manner that infrared light components contained in the output signals are equal to each other. A white balance may be properly adjusted by increasing or decreasing the output signal of each color component, and a second infrared light component for correction may be subtracted from the output signal of each color component in such a manner that infrared light components contained in the output signals are equal to each other. According to this structure and operation, a shift of the infrared light component due to the adjustment of white balance after the correction of the infrared light component can be avoided.

The infrared light component received by the image pickup device by way of the infrared transmitting filter may be multiplied by a coefficient to equalize the infrared light components contained in the output signal of each color component, and the infrared light component for correction may be obtained for each color component and may be added to the output signal of each color component. The infrared light component received by the image pickup device by way of the infrared transmitting filter may be multiplied by a coefficient to remove the infrared light components contained in the output signal of each color component, and the infrared light component for correction may be obtained for each color component and may be subtracted from the output signal of each color component.

Another embodiment of the present invention relates to an image pickup method. This method is such that, for an output signal of each color component from an image pickup device which receives an incident light by way of a color filter of multiple colors that transmits an infrared light component, the addition processing and the subtraction processing are switched therebetween according to a predetermined condition, wherein the addition processing adds a correcting infrared light component to correct an infrared light component contained in the output signal and the subtraction processing removes the infrared light component contained in the output signal from the output signal of each color component.

According to this embodiment, in order to correct an infrared component contained in the output signal of each color component, an infrared light component for correction is added or subtracted according to a predetermined condition. Thereby, the color reproducibility can be enhanced by adjusting the sensitivity.

An image pickup method according to one embodiment of the present invention is such that, for an output signal of each color component from an image pickup device which receives an incident light by way of a color filter of multiple colors that transmits an infrared light component, an infrared light component for correction is added so that infrared light components contained in the output signals are equal to each other. "Infrared light components are equal" includes also a case where the infrared light components are practically equal. If the difference in integration values of spectral sensitivity in the range of wavelength, which can be regarded as the infrared light component, contained in the output signal of each color component is $\frac{1}{100}$ or less of each integration value, then the infrared light components may be regarded as being equal. For example, when the difference in integration values for the component whose wavelength in the spectral sensitivity characteristics is 700 nm or more in the output signal of each color component is less than or equal to $\frac{1}{100}$, the infrared light components may be regarded as being equal.

According to this embodiment, the infrared light component for correction is added to the output signal of each color that contains an infrared light component in a manner such that the infrared light components contained in the outputs are each equal. Hence, the color reproduction can be achieved, in a highly sensitive manner, without using the infrared light cut filter.

A white balance may be achieved by increasing or decreasing the output signal of each color component, and an infrared light component for correction may be added to the output signal of each color component in such a manner that infrared light components contained in the output signals are each equal. According to this structure and operation, a shift of the infrared light component due to the adjustment of white balance after the correction of the infrared light component can be avoided. The infrared light component received by the image pickup device by way of the infrared transmitting filter may be multiplied by a coefficient to equalize the infrared light components contained in the output signal of each color component, and the infrared light component for correction may be obtained for each color component and may be added to the output signal of each color component. According to this structure and operation, the sensitivity to the incident light in an infrared light region of the image pickup devices can be practically equalized to one another (See FIG. 3 also).

Another embodiment of the present invention relates to an image pickup apparatus. This apparatus comprises: a color filter of multiple colors which transmits an infrared light component; an image pickup device which receives an incident light by way of the color filter; and a control unit which adds an infrared light component for correction, to an output signal of each color component of the image pickup device so that infrared light components contained in the output signals are mutually equal.

According to this embodiment, the correcting infrared light component is added to an output signal of each color that contains an infrared light component in a manner such that the infrared light components contained in the output signals are each equal. Hence, the color can be reproduced in a highly sensitive manner without using the infrared light cut filter.

It is to be noted that any arbitrary combination of the above-described structural components and the expressions according to the present invention changed among a method, an apparatus, a system and so forth are all effective as and encompassed by the present embodiments.

FIG. 1 is a diagram showing a structure of an image pickup apparatus 100 according to an embodiment of the present invention. The image pickup apparatus 100 includes a color filter 10, an infrared light transmitting filter 20, an image pickup device 30, a control unit 40, and a display unit 60. The color filter 10 separates an incident light into a plurality of colors and then supplies them to the image pickup device 30. If the color filter 10 is structured by three primary color filters, a Bayer array is implemented using three kinds of filters which are a filter that transmits red light (R), a filter that transmits green light (G) and a filter that transmits blue light (B).

If it is structured by complementary color filters, the incident light is separated into yellow (Ye), cyan (Cy) and magenta (Mg). Or, the incident light is separated into yellow (Ye), cyan (Cy) and green (Gr). Or, the incident light is separated into yellow (Ye), cyan (Cy), magenta (Mg) and green (Gr). Since the color filter 10 is not equipped with the infrared light cut filter, the color filter 10 transmits an infrared light component in addition to the visible light component, as described above.

The infrared light transmitting filter 20 transmits the infrared light component and supplies it to the image pickup device 30. The image pickup device 30 is comprised of a CCD (Charge Coupled Device) image sensor or a CMOS (Complementary Metal-Oxide Semiconductor) image sensor. A plate of the image sensor may be provided per color so as to combine images of each color. Or, the structure may be such that an incident light coming from the color filter 10 arranged in the Bayer array is received and an interpolation operation is done using the outputs of surrounding pixels to produce a color image.

The image pickup device 30 has a region that receives the light transmitted through the infrared light transmitting filter 20, in addition to a region that receives a plurality of color components transmitted through the color filter 10. The image pickup devices 30 supplies an image signal of multiple colors generated by subjecting the received color components to a photoelectric conversion and a signal generated by subjecting the received infrared components to the photoelectric conversion (this signal will be hereinafter denoted by "IR signal"), to the control unit 40.

The control unit 40 includes an infrared light component adjustment unit 42, a white-balance adjustment unit 44, a switching unit 46, a condition determining unit 48 and a condition table 50. In terms of hardware, the structure of the control unit 40 can be realized by any DSP, memory and other LSIs. In terms of software, it can be realized by memory-loaded programs and the like, but drawn and described herein are function blocks that are realized in cooperation with those. Hence, it is understood by those skilled in the art that these function blocks can be realized in a variety of forms such as by hardware only, software only or the combination thereof. Note that FIG. 1 shows function blocks of a minimum necessity for describing the present embodiment and therefore other functions in general are omitted.

The infrared light component adjustment unit 42 adds infrared light components for correction (hereinafter referred to as "correcting infrared light components" also) to the image signals of multiple colors supplied from the image pickup device 30, respectively. Hereinafter, this processing will be referred to as "adding processing". Alternatively, the infrared light component adjustment unit 42 subtracts the correcting infrared light components from the image signals of multiple colors supplied from the image pickup device 30, respectively. This processing will be referred to as "subtraction processing". Whether the adding processing, the subtraction processing or no adjustment of the infrared light components is to be performed is specified from the switching unit 46. The infrared light component adjustment unit 42 generates an infrared light component by multiplying an IR signal by a predetermined coefficient. The predetermined coefficient differs between the case of adding processing and the case of subtraction processing. Also, at least one of a plurality of correcting infrared light components to be used in the adding processing and those to be used in the subtraction processing may be generated. When generating the correcting infrared light components, the infrared light component adjustment unit 42 generates the infrared light components in a manner such that the infrared light component contained in an image signal of each color is practically equal to each other.

The white-balance adjustment unit 44 carries out correction in a manner that even in a state of light source where the color temperature differs, the white color is accurately produced in white. Accordingly, the white-balance adjustment unit 44 adjusts the sensitivity of the image pickup device 30 to the incident light of each color. More specifically, the size of a red R image signal, a green G image signal and a blue B image signal is so increased or decreased that the ratio of each image signal used to generate the white color by combining them is adjusted. Note that the white-balance adjustment unit 44 is not the essential component in the present embodiment, and a mode of carrying out the present invention where no white balance is performed at all is also effective.

According to a decision result by the condition determining unit 48, the switching unit 46 specifies to the infrared light component adjustment unit 42 whether the adding processing, the subtraction processing or no adjustment of the infrared light components is to be performed. Also, according the above decision result, which correcting infrared light component is to be used is specified if one is to be selected from a plurality of correction infrared light components.

The condition determining unit 48 generates a signal for use in condition determination from at least one of the image signal of multiple colors and the IR signal supplied from the image pickup device 30. For example, after the red R image signal, the green G image signal and the blue B image signal have been received from the image pickup device 30, an RGB space is converted to a YUV space. Here, Y indicates an luminance signal, U a differential signal in blue and V a differential signal in red. The condition determining unit 48 generates the luminance signal Y as a signal for use in condition determination. As a result, the brightness of captured pixels and images can be detected with ease.

Since the color filter 10 does not remove the infrared light component, not only the visible light components but also infrared light components are contained in the red R image signal, the green G image signal and the blue B image signal received from the image pickup device 30. The condition determining unit 48 can use a signal indicating a relation between the visible light components that contain an infrared light entered through the color filter 10 and the infrared light components obtained from the IR signal, as a signal for use in condition determination. For example, such a signal indicating the relation may be a signal indicating a magnitude relation between the above-described visible light components and the above-described infrared light components, a signal indicating the difference therebetween, or a signal indicating a ratio thereof.

Based on the signal for use in condition determination, the condition determining unit 48 selects a type of infrared light component adjustment processing by referring to the condition table 50, and specifies the selected type to the switching unit 46. The condition table 50 describes the above signals for use in determination and the types of infrared light component adjustment processing in a manner that associates the signals with the types of processing. Specific examples of the condition table 50 will be described later.

The display unit 60 displays an image generated based on the image signals which has been corrected by the control unit 40. That is, the display unit 60 displays the image generated based on the signals where the correcting infrared light components are added respectively to the image signals of multiple colors supplied from the image pickup device 30. Alternatively, the display unit 60 displays the image generated based on the signals where the correcting infrared light components are subtracted respectively from the image signals of multiple colors supplied from the image pickup device 30.

Prior to describing an operation of the image pickup apparatus 100 according to the present embodiment, an example of adding processing is first explained. In this example, a green G transmitting filter, a blue B transmitting filter and an infrared IR transmitting filter are used.

Figure 2:
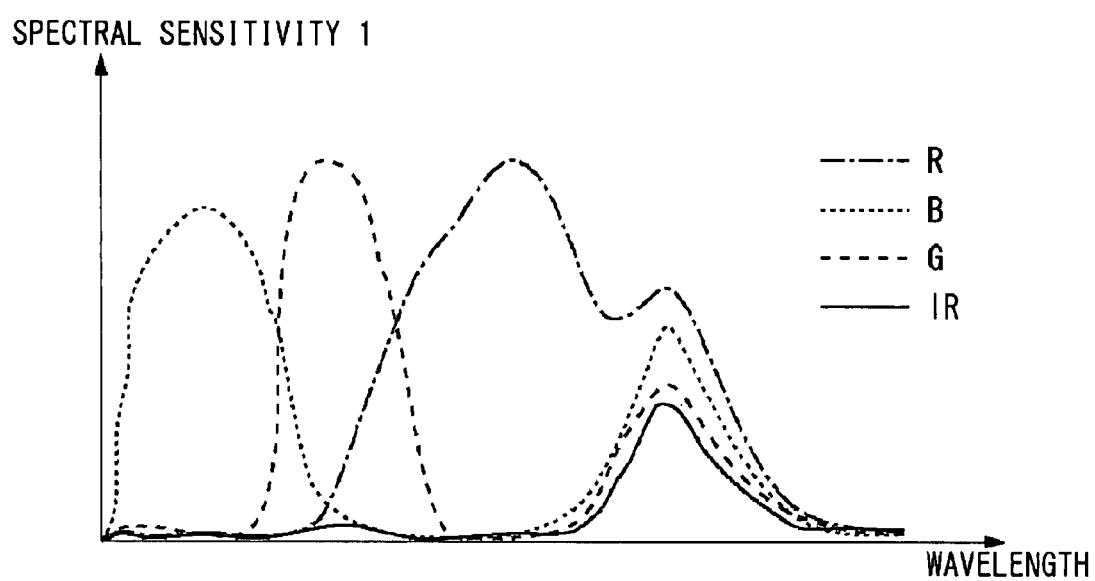
FIG. 2 is a graph showing an example of spectral sensitivity characteristics for incident light that has transmitted through three primary color filters and an infrared light transmitting filter of an image pickup device.

FIG. 2 is a graph showing an example of spectral sensitivity characteristics for the incident light that has transmitted through the three primary color filters and the infrared light transmitting filter of the image pickup device. As shown in FIG. 2, the image pickup device has a spectral sensitivity 1 for the incident light that has transmitted through the three primary color filters and the infrared light transmitting filter. Since the color filter in the present embodiment does not remove the infrared light component, it has also sensitivity to the wavelength of an infrared light region. Thus, the output signal of each color in the above-described image pickup device is corrected so that the sensitivities to the wavelengths of the incident light, in an infrared light region, which has transmitted through the respective three primary color filters are equal to one another.

Figure 3:
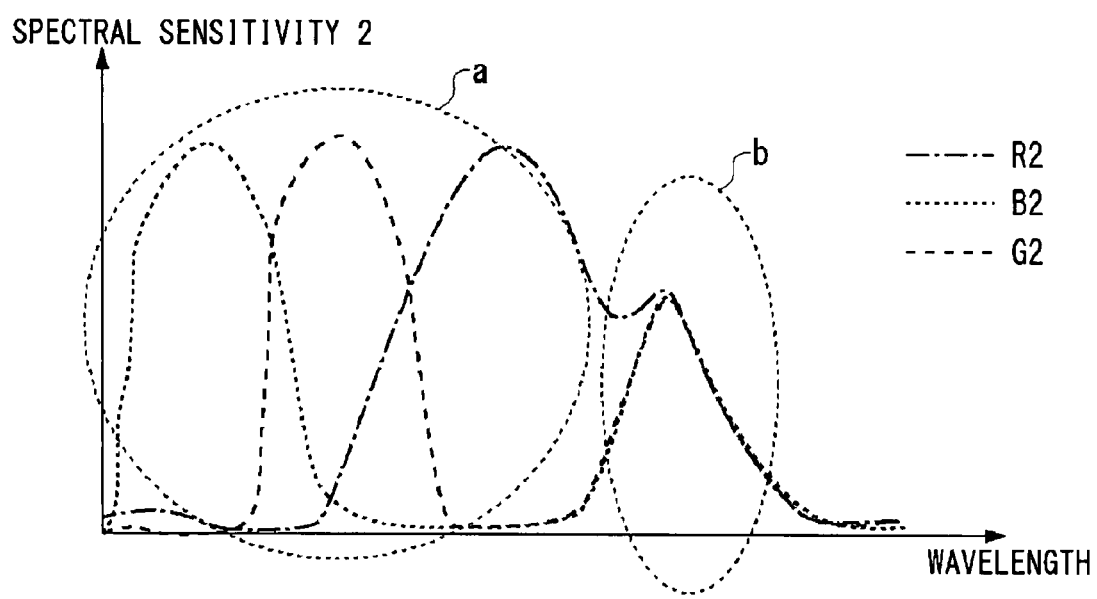
FIG. 3 is a graph showing an example of corrected spectral sensitivity characteristics for incident light that has transmitted through three primary color filters of an image pickup device.

FIG. 3 is a graph showing an example of corrected spectral sensitivity characteristics for the incident light that has transmitted through the three primary color filters of the image pickup device. As shown in FIG. 3, the image pickup device is so corrected as to have a spectral sensitivity 2 for the incident light that has transmitted through the three primary color filters. In order to do such correction, the following equations 1 to 3 are applied to a red output signal R, a green output signal G and a blue output signal B.

$$R2 = \alpha*R + \beta*IR \quad \text{(Equation 1)}$$

$$G2 = \gamma*G + \delta*IR \quad \text{(Equation 2)}$$

$$B2 = \epsilon*B + \zeta*IR \quad \text{(Equation 3)}$$

Each coefficient ($\alpha$ to $\zeta$) in the above Equations 1 to 3 are determined in a manner such that the values of infrared light components contained in the output signals of the respective colors are practically equal to one another while the white balance is achieved. The coefficients $\alpha$, $\gamma$ and $\epsilon$ are coefficients by which to properly adjust the white balance, whereas the coefficients $\beta$, $\delta$ and $\zeta$ are coefficients by which to practically equalize the values of infrared light components contained in the respective output signals. It is to be noted here that coefficients $\beta$, $\delta$ and $\zeta$ are positive values or zero. These coefficients can be derived through simulation or experiments carried out by a designer.

In the examples of FIG. 2 and FIG. 3, the red output signal R, the green output signal G and the blue output signal B are converted respectively to a corrected red output signal R2, a corrected green output signal G2 and a corrected blue output signal B2 by the following Equations 4 to 6.

$$R2 = 1.3*R \quad \text{(Equation 4)}$$

$$G2 = G + 0.65*IR \quad \text{(Equation 5)}$$

$$B2 = 1.55*B \quad \text{(Equation 6)}$$

In FIG. 3, region a indicates a state where the white balance is being achieved and region b indicates a state where the integration values of the infrared light components are practically equal.

A description is next given of subtraction processing. Similar to the adding processing, the subtraction processing uses the Equations 1 to 3. In the case of subtraction processing, the infrared light component is subtracted from at least one of the output signals of the respective colors in order to remove the infrared light components contained in the output values of the respective colors. Accordingly, the coefficients $\beta$, $\delta$ and $\zeta$ are negative values or zero. Of course, the white balance may be adjusted together with the subtraction processing. In order to practically equalize the infrared light components contained in the output signals of the respective colors, the infrared light component may be subtracted from at least one of the output signals of the respective colors. In this case, infrared light components remain in each output signal.

In either the adding processing or the subtraction processing, the combination of the coefficients $\beta$, $\iota$ and $\zeta$ is not necessarily one fixed way. Basically, the combination where the added value or the subtracted value is minimum is used. A combination where the added value is larger may be used when the luminance value is extremely small and therefore it is desired that the sensitivity be set high.

Now, a first exemplary embodiment of the present embodiment will be described. The first exemplary embodiment illustrates an example where the processing is switched between the adding processing and the subtraction processing according to the value of a luminance signal Y. FIG. 4 shows a condition table 50a according to the first exemplary embodiment. The condition table 50a associates the type of infrared light component adjustment processing with the pixel brightness divided in two kinds based on the luminance signal Y. The condition determining unit 48 generates the luminance signal Y as a signal used to determine the condition, by use of the above-described method. Then the condition determining unit 48 determines whether the value of the luminance signal Y exceeds a predetermined threshold value or not. If the value of the luminance signal Y exceeds the predetermined threshold value, it is determined to be a bright pixel; and if the value of the luminance signal Y is less than or equal to the predetermined threshold value, it is determined to be a dark pixel. It is to be noted here that such a predetermined threshold value can be set to a value derived through simulation or experiments carried out by a designer.

In the condition table 50a shown in FIG. 4, the subtraction processing is selected when it is a bright pixel, and adding processing is selected when it is a dark pixel. The switching unit 46 specifies either the adding processing or the subtraction processing to the infrared light component adjustment unit 42, based on a decision result of the condition determining unit 48.

After having decided on either one of the adding processing and the subtraction processing, the condition determining unit 48 may determine the degree of values added or subtracted, according to a difference between the value of the luminance value Y and the predetermined threshold value. For example, in a case where a plurality of kinds of combinations of coefficients β, δ and ζ in the above Equations 1 to 3 are prepared and set in the adding processing, the smaller the value of the luminance signal Y is than the predetermined threshold value, a combination of the larger coefficients β, δ and ζ will be selected. Also, in a case where a plurality of kinds of combinations of coefficients β, δ and ζ are prepared and set in the subtraction processing in a similar manner, the larger the value of the luminance signal Y is than the predetermined threshold value, a combination of the larger coefficients β, δ and ζ will be selected.

If a difference between the value of the luminance signal Y and the predetermined threshold value is smaller than a preset value, the condition determining unit 48 may select a state where neither of the adding processing and the subtraction processing is performed.

According to the above-described first exemplary embodiment, the color reproducibility can be enhanced by adjusting the sensitivity. That is, while the sensitivity is enhanced by adding the infrared light components to the pixels captured at a dark place, the color balance can be adjusted. Also, the infrared light components are subtracted from the pixels captured at a bright place, so that the color balance can be adjusted by suppressing the increase in noise components as compared with the case of adding the infrared light components.

The degree of infrared light components to be added or subtracted is varied according to the decision result, so that the sensitivity can be set within a desired range. If the white balance is also adjusted at the time when the infrared light components are corrected, the following situation can be avoided. That is, such a situation is that the adjustment of the infrared light components is invalidated in a case when the white balance is adjusted in a post-image processing.

A description is next given of a second exemplary embodiment of the present embodiment. This is an example where whether the adding processing or the subtraction processing is to performed is switched therebetween according to the magnitude relation between the visible light components and the infrared light components entered via the color filters 10.

FIG. 5 shows a condition table 50b according to the second exemplary embodiment. The condition table 50b associates the magnitude relation with the type of infrared light component adjustment processing. Using the above-described method, the luminance signal Y is generated as a signal for use in condition determination. This luminance signal Y contains infrared light components in addition to the visible light components. The condition determining unit 48 determines the magnitude relation between this visible light component and the infrared light obtained from the IR signal.

In the condition table 50b shown in FIG. 5, when the visible light component contained in the above luminance signal Y is larger than the above infrared light component, the subtraction is selected; and when smaller, the adding processing is selected. Based on the decision result by the condition determining unit 48, the switching unit 46 specifies the adding processing or subtraction processing to the infrared light component adjustment unit 42.

Note that after having determined either one of the adding processing and the subtraction processing, the condition determining unit 48 may determine the degree of values added or subtracted, according to a difference between the value of the above luminance value Y and the above infrared light component, in a similar manner to the first exemplary embodiment. Similarly to the first exemplary embodiment, if a difference between the value of the visible light component contained in the luminance signal Y and a predetermined threshold value is smaller than a preset value, the condition determining unit 48 may select a state where neither of the adding processing and the subtraction processing is performed.

According to the second exemplary embodiment as described above, the color reproducibility can be enhanced by adjusting the sensitivity. That is, when the visible light component is smaller than the infrared light component, adding the infrared light component can adjust the color balance while the sensitivity is enhanced. Also, when the visible light component is larger than the infrared light component, the infrared light component is subtracted, so that the color balance can be adjusted.

A description is next given of a third exemplary of the present embodiment. The third exemplary embodiment is an example where the condition described in the first exemplary embodiment is combined together with that in the second exemplary embodiment and the determination is made using the combined conditions.

Figure 6:
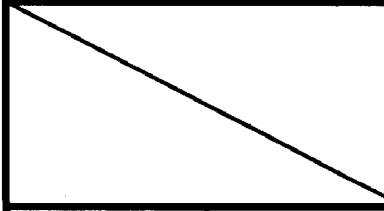
FIG. 6 shows a condition table according to a third exemplary embodiment.

FIG. 6 shows a condition table 50c according to the third exemplary embodiment. The condition table 50c associates a combination of the absolute values of visible light components contained in the luminance signal Y and the magnitude relation between the visible light components and the infrared light components contained in the luminance signal Y, with the types of infrared light component adjustment processing. If the above luminance signal Y exceeds the above predetermined threshold value and the visible light component contained in the luminance signal Y is larger than the above infrared light component, the subtraction processing will be selected in the condition table 50c. In the cases of the other combinations, the adding processing will be selected. Based on a decision result by the condition determining unit 48, the switching unit 46 specifies the infrared light component adjustment unit 42 to perform either the adding processing or the subtraction processing.

Figure 7:
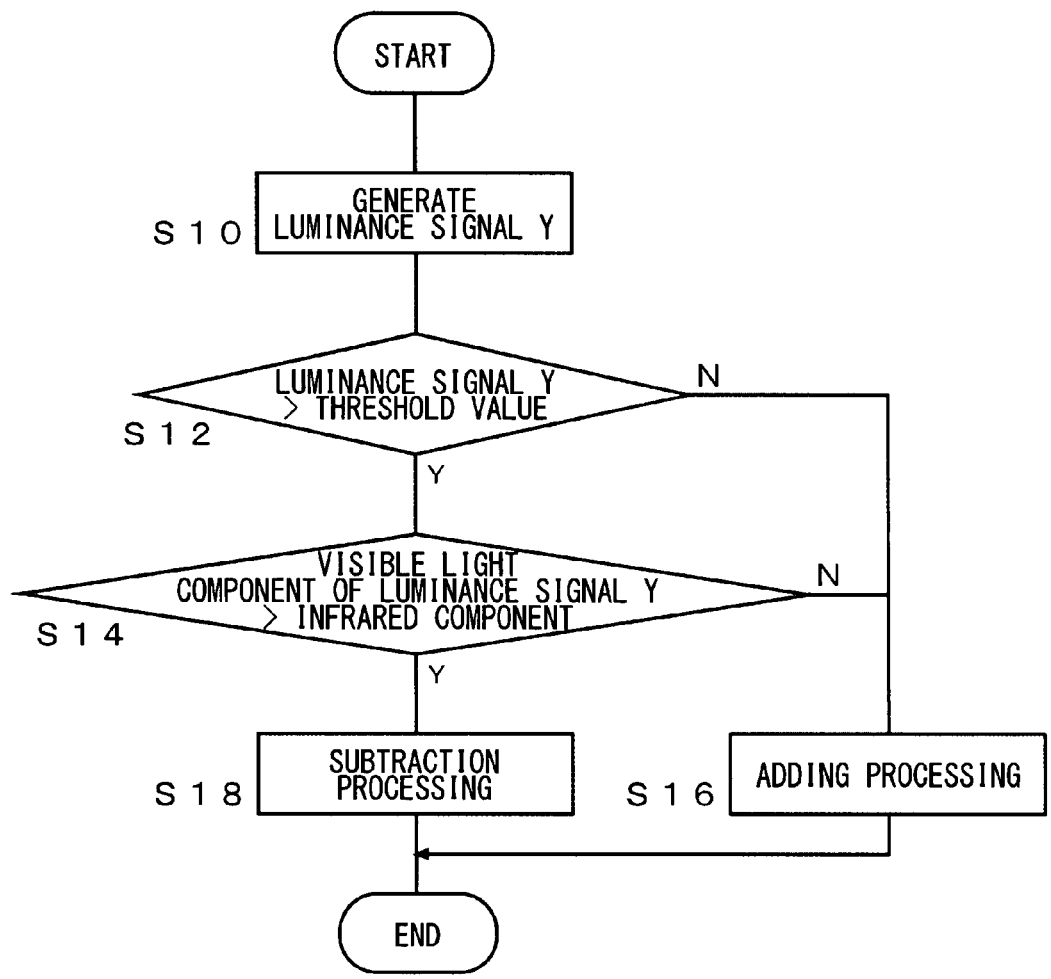
FIG. 7 is a flowchart showing an operation of an image pickup apparatus according to a third exemplary embodiment.

FIG. 7 is a flowchart showing an operation of the image pickup apparatus 100 according to the third exemplary embodiment. First, using the above-described method, the condition determining unit 48 generates a visible light component contained in the luminance signal Y, as a signal for use in condition determination (S10). The condition determining unit 48 compares the absolute value of the generated visible light component contained in the luminance signal Y with the above predetermined threshold value (S12). If the absolute value of the visible light component contained in this luminance signal Y is less than or equal to the above predetermined threshold value (N of S12), the adding processing will be selected (S16). If the absolute value of the visible light component contained in this luminance signal Y exceeds the above predetermined threshold value (Y of S12), the condition determining unit 48 will compare the visible light component contained in the generated luminance signal Y with the infrared light component contained therein (S14).

If the visible light component contained in this luminance signal Y is larger than the infrared light component contained therein (Y of S14), the subtraction processing will be selected (S18). If the visible light component contained in this luminance signal Y is less than or equal to the infrared light component contained therein (N of S14), the adding processing will be selected (S16).

After having decided on either one of the adding processing and the subtraction processing, the condition determining unit 48 may determine the degree of values added or subtracted, according to a difference between the absolute value of the visible light component contained in the luminance value Y and the predetermined threshold value, similarly to the first exemplary embodiment. Similarly to the first exemplary embodiment, if the difference between the absolute value of the visible light component contained in the luminance signal Y and the predetermined threshold value is smaller than a preset value, the condition determining unit 48 may select a state where neither of the adding processing and the subtraction processing is performed.

According to the third exemplary embodiment as described above, images can be picked up with high sensitivity no matter whether the image is picked up at bright or dark place and no matter whether the infrared light component is large or small. Also, the color reproducibility can be enhanced without using the infrared light cut filter.

The present invention has been described based on some embodiments. These embodiments are merely exemplary, and it is understood by those skilled in the art that various modifications to the combination of each component and each process thereof are possible and that such modifications are also within the scope of the present invention.

In second exemplary embodiment, if the difference between or the ratio of the visible light component entered by way of the color filter 10 and the infrared light component obtained from the IR signal is used as a signal for use in condition determination, this difference or ratio needs to be compared against a predetermined threshold value. Such a threshold value can also be set to a value derived through simulation or experiments carried out by a designer.

The image pickup apparatus 100 may perform the adding processing only, without performing the subtraction processing at all. In such a case, there is no need to provide the switching unit 46, the condition determining unit 48 and the condition table 50 in the control unit 40. In this modification, too, the following advantageous effects are achieved. The color reproduction can be achieved, in a highly sensitive manner, without using an infrared light cut filter. That is, an infrared light component is added to the image signal of each color so as to realize the high sensibility. Also, the processing is so performed as to equalize the infrared light component contained in the image signal of each color. Hence, the image signal of each color is added with a certain fixed increment of infrared light component. As a result, the balance of the visible light components can be maintained and therefore the color reproducibility can be enhanced. If the white balance is also adjusted at the time when the infrared light components are corrected, the following situation can be avoided. That is, such a situation is that the adjustment of the infrared light components is invalidated in a case when the white balance is adjusted in a post-image processing.

In the above embodiment, an example has been shown where the red R transmitting filter, the green G transmitting filter, the blue B transmitting filter and the infrared IR transmitting filter are used. In this regard, a yellow Ye transmitting filter, a cyan Cy transmitting filter and a magenta Mg transmitting filter and an infrared light IR transmitting filter may be used.

Figure 8:
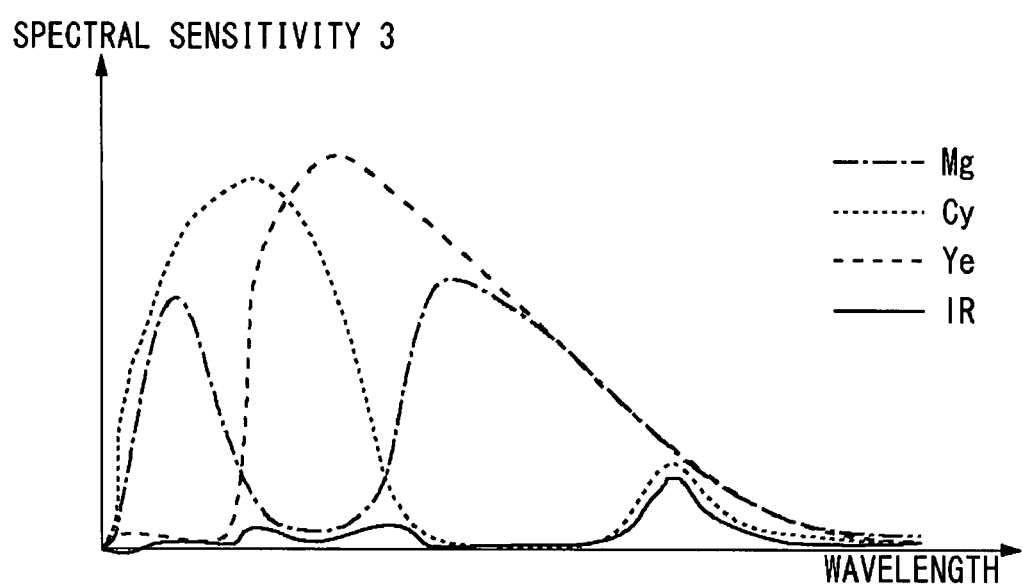
FIG. 8 is a graph showing an example of spectral sensitivity characteristics for incident light that has transmitted through complementary filters and an infrared light transmitting filter of an image pickup device.

FIG. 8 is a graph showing an example of spectral sensitivity characteristics for incident light that has transmitted through complementary filters and an infrared light transmitting filter of the image pickup device. As shown in FIG. 8, the image pickup device has a spectral sensitivity 3 for the incident light that has transmitted through the complementary filters and the infrared light transmitting filter.

Figure 9:
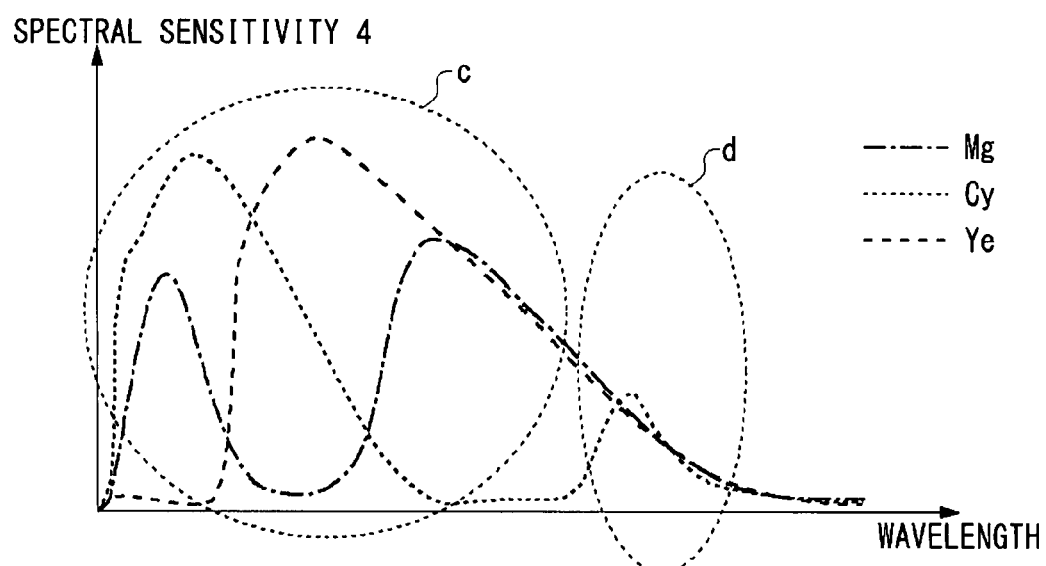
FIG. 9 is a graph showing an example of corrected spectral sensitivity characteristics for incident light that has transmitted through complementary filters of an image pickup device.

FIG. 9 is a graph showing an example of corrected spectral sensitivity characteristics for incident light that has transmitted through the complementary filters of the image pickup device. As shown in FIG. 9, the image pickup device is so corrected as to have a spectral sensitivity 4 for the incident light that has transmitted through the complementary filters. In order to do this correction, the similar conversion equations to the above equations 1 to 3 are applied to the yellow Ye output signal, the cyan Cy output signal and the magenta Mg output signal of the image pickup device. In FIG. 9, region c indicates a state where the white balance is being achieved and region d indicates a state where the integration values of the infrared light components are practically equal.

While the preferred embodiments of the present invention have been described using specific terms, such description is for illustrative purposes only, and it is to be understood that changes and variations may be further made without departing from the spirit or scope of the appended claims.

What is claimed is:

1. An image pickup apparatus, comprising:
    a color filter of multiple colors which transmits an infrared light component;
    an image pickup device which receives an incident light by way of said color filter; and
    a control unit which switches, according to a predetermined condition, between an addition processing where a correcting infrared light component for correcting an infrared light component contained in an output signal is added to the output signal of each color component in said image pickup device and a subtraction processing where the infrared light component contained in the output signal is removed from the output signal of each color component.

2. An image pickup apparatus according to claim 1, wherein said control unit detects brightness of a captured pixel from the output signal of each color component and switches between the addition processing and the subtraction processing according to the brightness thereof.

3. An image pickup apparatus according to claim 2, wherein said control unit switches between the addition processing and the subtraction processing according to a relation between a visible light component contained in the output signal of each color component and the infrared light component received by said image pickup device.

4. An image pickup apparatus according to claim 2, wherein when a luminance value obtained from the output value of each color component exceeds a predetermined threshold value and is greater than the infrared light component received by the image pickup device, said control unit selects the subtraction processing.

5. An image pickup apparatus according to claim 1, wherein said control unit switches between the addition processing and the subtraction processing according to a relation between a visible light component contained in the output signal of each color component and the infrared light component received by said image pickup device.

6. An image pickup apparatus according to claim 5, wherein when a luminance value obtained from the output value of each color component exceeds a predetermined threshold value and is greater than the infrared light component received by the image pickup device, said control unit selects the subtraction processing.

7. An image pickup apparatus according to claim 1, wherein when a luminance value obtained from the output value of each color component exceeds a predetermined threshold value and is greater than the infrared light component received by the image pickup device, said control unit selects the subtraction processing.

8. An image pickup apparatus characterized in that for an output signal of each color component from an image pickup device which receives an incident light by way of a color filter of multiple colors that transmits an infrared light component,
an addition processing and a subtraction processing are switched therebetween according to a predetermined condition,
wherein the addition processing is such that a correcting infrared light component is added to correct an infrared light component contained in the output signal and the subtraction processing is such that the infrared light component contained in the output signal is removed from the output signal of each color component.

9. An image pickup method according to claim 8, the brightness of a captured pixel is detected from the output signal of each color component, and the addition processing and the subtraction processing are switched therebetween according to the brightness thereof.

10. An image pickup method according to claim 8, wherein the addition processing and the subtraction processing are switched therebetween according to a relation between a visible light component contained in the output signal of each color component and an infrared light component received by the image pickup device.

11. An image pickup method characterized in that for an output signal of each color component from an image pickup device which receives an incident light by way of a color filter of multiple colors that transmits an infrared light component, an infrared light component for correction is added in such a manner that infrared light components contained in the output signals increased by the addition are equal to each other.

12. An image pickup method according to claim 11, wherein a white balance is achieved by increasing or decreasing the output signal of each color component, and an infrared light component for correction is added to the output signal of each color component in such a manner that infrared light components contained in the output signals are equal to each other.

13. An image pickup method according to claim 12, wherein the infrared light component received by the image pickup device by way of the infrared transmitting filter is multiplied by a coefficient to equalize the infrared light components contained in the output signal of each color component, and
the infrared light component for correction is obtained for each color component and is added to the output signal of each color component.

14. An image pickup method according to claim 11, wherein the infrared light component received by the image pickup device by way of the infrared transmitting filter is multiplied by a coefficient to equalize the infrared light components contained in the output signal of each color component, and
the infrared light component for correction is obtained for each color component and is added to the output signal of each color component.

15. An image pickup apparatus, comprising:
a color filter of multiple colors which transmits an infrared light component;
an image pickup device which receives an incident light by way of said color filter; and
a control unit which adds an infrared light component for correction, to an output signal of each color component of the image pickup device so that infrared light components contained in the output signals increased by the infrared light component addition are mutually equal.

16. An image pickup apparatus according to claim 15, wherein said control unit adjusts a white balance by increasing or decreasing the output signal of each color component, and adds an infrared light component for correction to the output signal of each color component in such a manner that infrared light components contained in the output signals are equal to each other.

17. An image pickup apparatus according to claim 15, wherein said control unit multiplies the infrared light component received by the image pickup device by way of the infrared transmitting filter, by a coefficient to equalize the infrared light components contained in the output signal of each color component, obtains, for each color component, the infrared component for correction, and adds the infrared light component for correction to the output signal of each color component.

18. An image pickup apparatus, comprising:
a color filter of multiple colors which transmits an infrared light component;
an image pickup device which receives an incident light by way of said color filter;
a control unit which adds an infrared light component for correction, to an output signal of each color component of the image pickup device so that infrared light components contained in the output signals increased by the addition infrared light component addition are mutually equal; and
a display unit which displays an image generated based on a signal to which an infrared light component for correction has been added to the output signal of each color component.

* * * * *